July 16, 1963 — C. J. STEKETEE — 3,097,852
OSCILLATORY SPREADER FOR GRANULAR OR PULVERIZED MATERIALS
Filed Feb. 1, 1962 — 2 Sheets-Sheet 1
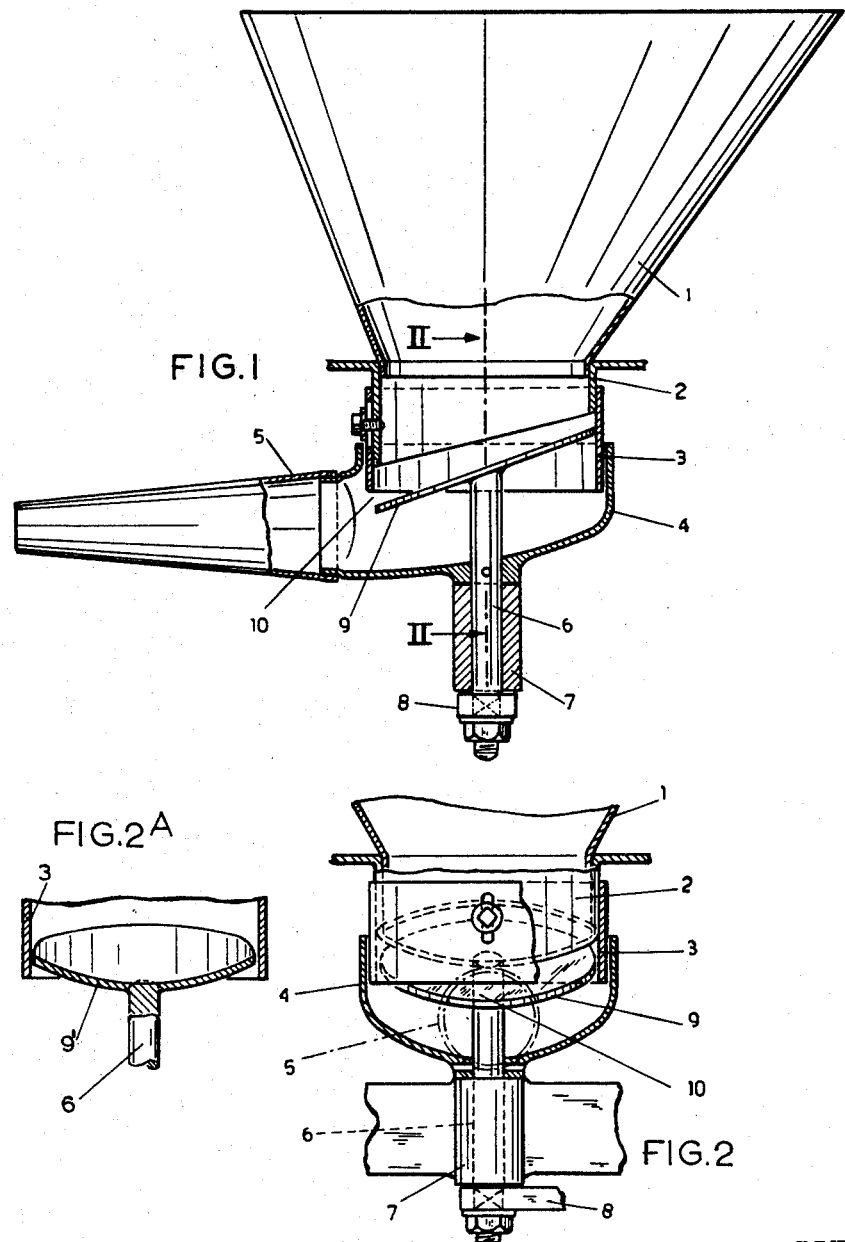
INVENTOR
CORNELIS J. STEKETEE
BY
ATTORNEYS July 16, 1963 C. J. STEKETEE 3,097,852
OSCILLATORY SPREADER FOR GRANULAR OR PULVERIZED MATERIALS
Filed Feb. 1, 1962 2 Sheets-Sheet 2

INVENTOR
CORNELIS J. STEKETEE

BY *Tuirie and Sunley*

ATTORNEYS

United States Patent Office 3,097,852
Patented July 16, 1963

3,097,852
OSCILLATORY SPREADER FOR GRANULAR OR PULVERIZED MATERIALS
Cornelis J. Steketee, 11 Korteweg,
Driewegen (Z.B.), Netherlands
Filed Feb. 1, 1962, Ser. No. 170,375
Claims priority, application Netherlands Mar. 6, 1961
6 Claims. (Cl. 275—8)

This invention relates to an apparatus for spreading or sowing granular or pulverized materials, which is provided with a hopper supported by a travelling frame and from which the material is discharged by a spreading member located below the cylindrical outlet mouth of the hopper and being rotated or angularly reciprocated about a vertical axis.

With known spreading apparatus of this kind the discharge mouth of the hopper is provided with a disc having passages but when operating with humid fertilizers the drawback is encountered that said passages become clogged. It has, therefore, been proposed to provide a stirring member in the outlet mouth of the hopper.

According to the invention said drawback is removed by securing on the axis of the spreading member a disc under an inclination with respect to said axis. Said disc on part of its circumference may extend below the lower edge of the outlet mouth of the hopper, and said lower edge at least on part of its circumference being located in a plane perpendicular to the axis of the spreading member. With said arrangement the inclined disc during its rotation will exert a vertical thrust on the material contained in the hopper, whereby movements in the material are generated and the danger of the material becoming stuck in the mouth of the hopper is removed. Thereby the material will slide downwards on the inclined disc and escape through the slot which the disc leaves at the lower edge of the outlet mouth of the hopper in order to be spread by the spreading member.

With an apparatus in which the spreading member is constituted by a spout angularly reciprocating in transverse direction and extending opposite to the travelling direction of the frame, the disc according to the invention may be mounted with respect to the longitudinal axis of the spout in such a manner that the slot which the disc leaves at the lower edge of the outlet mouth of the hopper presents its largest height in the vertical plane through the axis of the spout.

With a suitable embodiment of the apparatus according to the invention the disc may be adjustably secured to the axis of the spreading member so as to vary the inclination of the disc.

In order to still promote the stirring action of the disc according to the invention the plane of the disc may be curved and the concave side of the disc may face upwards. For reducing the length and increasing the height of the sickle-shaped slot which the disc leaves at the lower edge of the outlet mouth of the hopper for the material to be spread the disc may be curved in two directions.

The invention will be further described with reference to the accompanying drawings illustrating several embodiments of an apparatus, the spreading member of which is formed as an angularly reciprocating spout.

In the drawings:

FIG. 1 is a side view of the hopper with the spout located below said latter in the first embodiment, the outlet mouth of the hopper and part of the spout being shown in sectional elevation.

FIG. 2 is a sectional view taken on line II—II of FIG. 1.

FIG. 2A is a fragmentary sectional view similar to that of FIG. 2 but showing a second embodiment.

Figure 3:
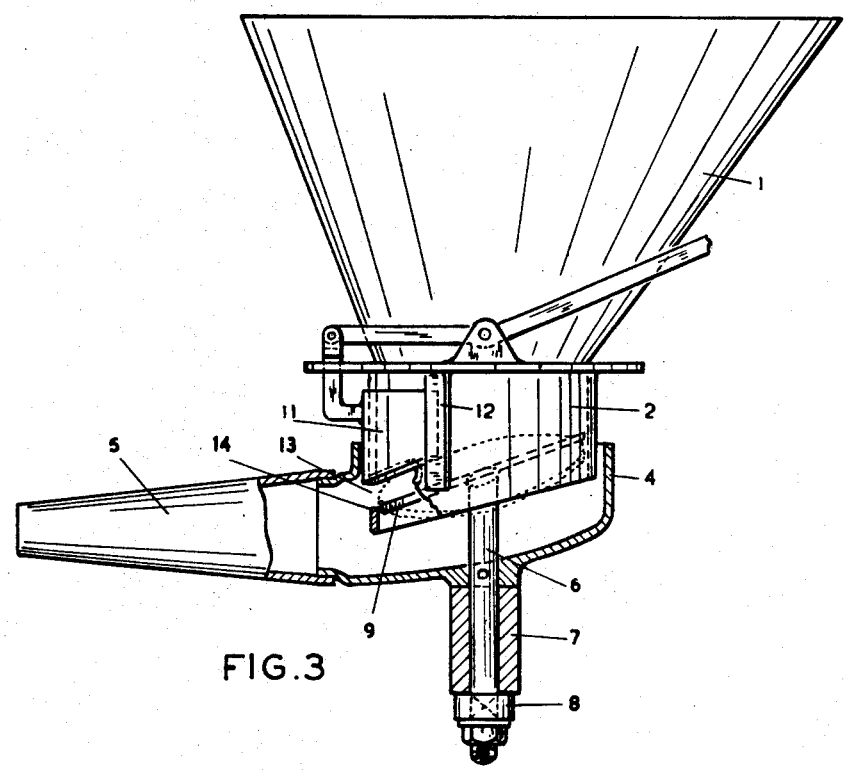
FIGS. 3 and 4 show a similar side view and a sectional view respectively of a third embodiment.
Figure 5:
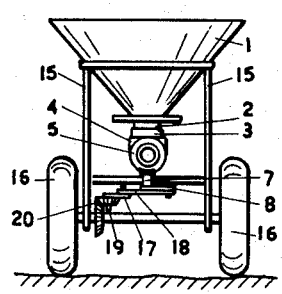
FIG. 5 is a rear view on a smaller scale of the apparatus shown in FIGS. 1 and 2.

As shown in FIGS. 1 and 2 the hopper 1 at its lower end is provided with a mouth 2, which is surrounded by a cylindrical sleeve 3 adapted to be adjusted vertically. The sleeve 3 which constitutes the outlet mouth proper of the hopper is embraced by a bowl 4, provided with a spout 5. The bowl 4 is secured to a shaft 6 supported in a bearing 7 on a frame 15 and having a lever 8 secured thereto. The hopper 1 is also supported on frame 15 and said latter is provided with ground wheels 16.

The shaft 6 of bowl 4 is driven by a crank 17 secured on shaft 19 through the intermediary of a rod 18 connected to lever 8. Shaft 19 receives its drive from the axle 21 of the ground wheels 16 through a gear 20.

A disc 9 is secured to the upper end of shaft 6 and may be inclined under an angle of about 20° but in accordance with the nature of the material to be spread or to be sown the inclination of the disc may be less or more. The disc 9 leaves at the lower edge of the outlet mouth 3 a slot 10 having its largest height in the vertical plane through the longitudinal axis of the spout 5. As the disc 9 moves together with the spout 5 said position of the slot 10 with respect to the spout does not vary, so that a continuous supply of material from the hopper to the spout is secured.

The sleeve 3 may be lowered to such an extent that the disc 9 is completely surrounded by the sleeve, so that no material will be discharged. The adjustment of the sleeve 3 may be effected by the drive of the machine from its seat.

The embodiment illustrated in FIG. 2A is in all respects similar to that described above except that the disc is curved rather than flat. The modified disc 9' is secured on the shaft 6 with its concave surface facing upwardly.

Figure 4:
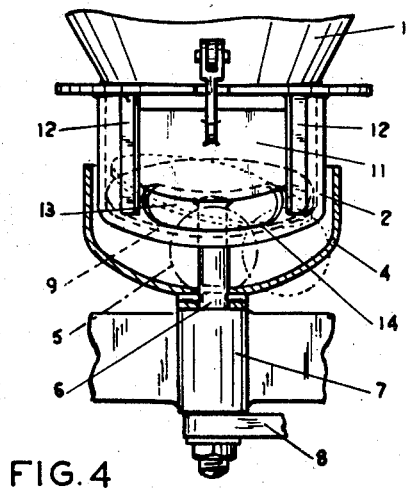

With the embodiment shown in FIGS. 3 and 4 a slot 13 is provided in the circumferential wall of the mouth 2 and the lower edge 14 of said slot is in the central position of the spout 5 substantially at the same level as the circumferential edge of the upper face of the disc 9 and extends in a plane parallel to the plane of the disc.

As also with said embodiment the disc 9 moves together with the spout the disc during the angular reciprocation of the spout will ascend on either side above a portion of the lower edge 14 of slot 13, in such a manner, that the fertilizer may slide continuously in the direction towards spout 5.

A slide 11 is adjustably mounted in guides 12 on the wall of the mouth 2 at the slot 11 and said slide is adapted to close said slot, if desired.

What I claim is:

1. In an apparatus for spreading or sowing granular or pulverized materials having a hopper supported by a traveling frame and from which the material is discharged by a spreading member located below the cylindrical outlet mouth of the hopper and being rotated or angularly reciprocated about a vertical axis, the improvements comprising a disc secured on the vertical axis of the spreading member at an inclination with respect to said axis and in the outlet mouth of the hopper, said disc on part of its circumference extending below the lower edge of the outlet mouth of the hopper to provide a discharge slot, and said lower edge of the hopper outlet mouth at least on part of its circumference being located in a plane perpendicular to said axis of the spreading member.

2. In an apparatus for spreading or sowing granular or pulverized materials having a hopper supported by a traveling frame and from which the material is discharged by a spreading member located below the cylindrical outlet mouth of the hopper and being rotated or angularly reciprocated about a vertical axis, the improvements comprising a disc secured on the vertical axis of the spreading member at an inclination with respect to said axis and in the outlet mouth of the hopper, and a slot in the circumferential wall of the outlet mouth of the hopper, said slot extending on part of the circumference of said wall in such a manner that said inclined disc on its rotation ascends at its circumference above the lower edge of the slot.

3. In an apparatus according to claim 2, the further improvements comprising a semicylindrical closure member slidably mounted on said circumferential wall of the outlet mouth of the hopper, said closure member being movable to partially and completely cover said slot.

4. In an apparatus for spreading or sowing granular or pulverized material having a hopper supported by a traveling frame and from which the material is discharged by a spreading member located below the cylindrical outlet mouth of the hopper and being angularly reciprocated about a vertical axis, the improvements comprising a disc secured on the vertical axis of the spreading member at an inclination with respect to said axis and in the outlet mouth of the hopper, said spreading member including a spout extending opposite to the traveling direction of the frame and angularly reciprocating transverse to said direction, said disc being mounted with respect to the longitudinal direction and axis of the spout in such a manner that the disc leaves a slot at the lower edge of the outlet mouth of the hopper, which slot presents its largest height in a vertical plane through the longitudinal axis of the spout.

5. In an apparatus for spreading or sowing granular or pulverized materials having a hopper supported by a traveling frame and from which the material is discharged by a spreading member located below the cylindrical outlet mouth of the hopper and being angularly reciprocated about a vertical axis, the improvements comprising a disc secured on the vertical axis of the spreading member at an inclination with respect to said axis and in the outlet mouth of the hopper, said spreading member including a spout angularly reciprocating in transverse direction and extending opposite to the traveling direction of the frame, a slot in the circumferential wall of the outlet mouth of the hopper, said disc being mounted in such a manner with respect to the longitudinal direction of the spout that in the central position of the spout with respect to said slot the circumference of the upper face of the disc is on the same level as the lower edge of the slot.

6. In an apparatus for spreading or sowing granular or pulverized materials having a hopper supported by a traveling frame and from which the material is discharged by a spreading member located below the cylindrical outlet mouth of the hopper and being rotated or angularly reciprocated about a vertical axis, the improvements comprising a disc secured on the vertical axis of the spreading member at an inclination with respect to said axis and in the outlet mouth of the hopper, said disc on part of its circumference extending below the lower edge of the outlet mouth of the hopper to provide a discharge slot, the plane of said disc being curved to present a concave face upwardly.

References Cited in the file of this patent

UNITED STATES PATENTS

| | | |
|---|---|---|
| 186,410 | Buist et al. | Jan. 23, 1877 |
| 1,454,575 | Boyd | May 8, 1923 |
| 2,547,143 | Speicher | Apr. 23, 1951 |

FOREIGN PATENTS

| | | |
|---|---|---|
| 1,084,509 | Germany | June 30, 1960 |
| 493,588 | Italy | Apr. 27, 1954 |